Nov. 24, 1936.　　　C. P. EISENHAUER　　　2,061,797

WATER SOFTENER

Filed April 9, 1931　　2 Sheets-Sheet 1

Patented Nov. 24, 1936

2,061,797

UNITED STATES PATENT OFFICE 2,061,797

WATER SOFTENER

Charles P. Eisenhauer, Dayton, Ohio

Application April 9, 1931, Serial No. 528,827

33 Claims. (Cl. 210—24)

This invention relates to apparatus used for treating water, more particularly treating hard water to make it soft.

Apparatus for this purpose is well known and commonly includes a tank containing material for treating water and a reservoir containing a liquid adapted to regenerate the treating material from time to time as required. The tank is provided with an inlet for water from a source of supply, and an outlet for treated water, which treated water passes to its destination, such as the water system of a dwelling, hotel or other user of water. After a time, depending upon the size or capacity of the apparatus, the material for treating the water becomes exhausted, that is, it loses its capacity for softening water. But instead of discarding the material it is regenerated with liquid from said reservoir, and for this purpose provision is made f_r cutting the outlet off from said destination and utilizing water from the source of supply for introducing regenerative liquid to the treating tank, afterward flushing or rinsing the material to free it from remaining regenerative liquid, and finally restoring the apparatus to condition for treating water and delivering it to said destination. I refer to these several steps collectively as reconditioning.

There are three principal types of water treating or softening devices, namely, manually controlled, automatic and semi-automatic. The present invention relates to the last of these types, in which the regenerative operation is initiated manually, after which it continues automatically, finally restoring the apparatus to its water-softening condition without further attention on the part of the person who initiated the regenerative operation. As the leading characteristics and objections to or merits of the manual and automatic types are well known, I shall not enumerate them here, but will proceed to state the advantages and merits of my apparatus.

One of the objects of my invention is to provide means for initiating the process of regeneration at any desired time, thus enabling the operator to do it at a time when it will not interfere with the normal demands upon the water system served by the apparatus. Initiation of the operation is but the work of a moment, requiring merely the lifting of a lever, and in the case of a domestic system the householder or other person having the matter in charge may do this, for example, just before retiring at night at regular intervals, say once a week. In larger installations, containing two or more units the person in charge can initiate the operation in one unit at a time at any time of day or night without interruption of the service by the other units.

Another object of my invention is to materially reduce the time required for regenerating a unit, and another object is to avoid loss of regenerative liquid when a new supply of regenerative material, usually salt, is put into the reservoir.

Another object is to rid the reservoir of various obstructions which have hitherto occupied large amounts of space, leaving practically the entire reservoir for storage of salt and brine.

I shall now proceed to describe my apparatus in detail, with the aid of the accompanying drawings, in which.

Figure 1:
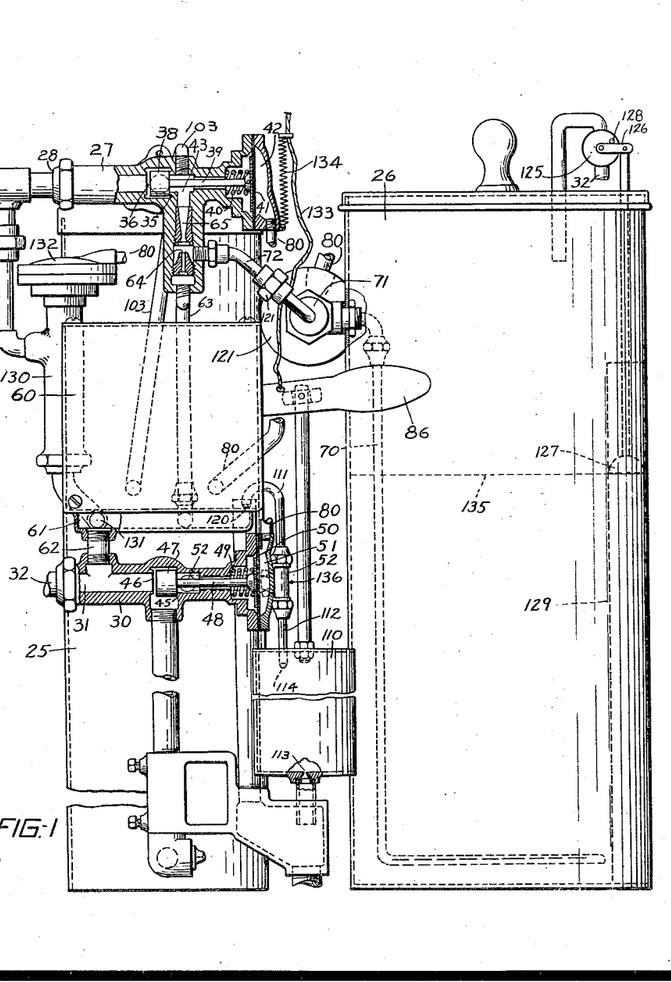
Fig. 1 is a front elevation of a water softener equipped with my improvements.
Figure 2:
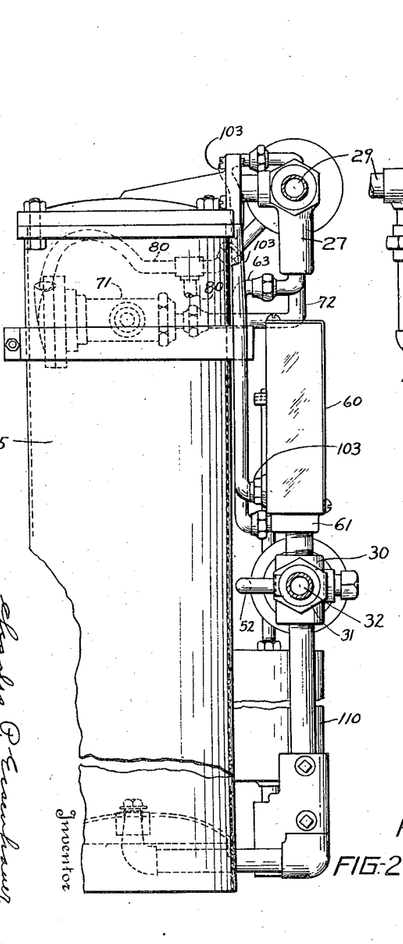
Fig. 2 is a side elevation, as seen from the left hand side of Fig. 1.

Referring first to Figs. 1 and 2, the tank containing water-treating or softening material is shown at 25, and beside it (seen only in Fig. 1) is the reservoir 26 containing a substance for regenerating the softening material, namely, salt and brine. Connected to the top of the tank 25 is a two-way or dual valve, indicated generally at 27, which valve is connected at 28 to the pipe 29 whereby soft water is delivered to the water system of the building. Another two-way or dual valve, indicated generally at 30, receives hard water at 31 from a supply pipe 32. As seen in Fig. 1 the valve 30, which is shown in section, connects the supply pipe 32 to the lower part of the tank 25, while the valve 27, also shown in section, connects the upper part of the tank to the destination of the soft water, the house pipe 29. This is what I shall refer to as the water-treating or softening condition of the apparatus. Water from the supply pipe 32 passes through the valve 30 to the lower part of the tank 25, through the softening material in the tank, by which it is softened, out at the upper end of the tank, through the valve 27 to the house pipe 29.

The valve 27 has two seats, 35 and 36, and a movable valve member 38 adapted to occupy either of the seats. This valve member is carried by a slidable rod or plunger 39 and it is normally held to the seat 35 by a compression spring 40. The plunger 39 impinges on a flexible diaphragm 41 forming one wall of a chamber 42. When water under pressure is let into the chamber 42 the plunger 39 is moved by the diaphragm in opposition to the spring and the valve member 38 is moved from the seat 35 to the seat 36, thereby cutting off the soft water pipe 29 and connecting the top of the tank to a chamber 43 in the valve 27.

The valve 30 also has two seats, 45 and 46, with a valve member 47 adapted to occupy either seat, but normally on seat 45. The valve member 47 is carried by a plunger 48, and is held to the seat 45 by a compression spring 49, being moved to the seat 46 by a diaphragm 50 when water under pressure is admitted to the chamber 51. When the valve member is moved to the seat 46 the supply pipe 32 is cut off from the lower part of the tank, which part of the tank is then connected to a drain pipe 52.

Mounted on the outside of the tank 25 is a casing 60, for a purpose that will be referred to presently. A chamber 61 in the lower part of the casing 60 is permanently connected to the supply pipe 32 at 62, which is a connection from the valve 30 but never cut off from the source of water supply. Tapping the chamber 61 is a pipe 63, connected to a nozzle 64 forming part of an injector. The throat 65 of the injector discharges into the chamber 43 in the valve 27. It will now be seen that after the valves 27 and 30 are operated by water introduced into the hydraulic chambers 42 and 51, water from the supply 32 passes through the pipe 62, the chamber 61, pipe 63, the injector 64—65, and chamber 43 to the upper part of the tank 25; thence down through the softening material in the tank, out through the bottom of the tank to the valve 30, and through the valve to the waste pipe 52. I shall now describe a means for introducing brine into this flow of water, whereby to regenerate the water-softening material in the tank.

The reservoir 26 contains a saturated solution of salt, and in the bottom of the reservoir there is a quantity of undissolved salt. A suction pipe 70 which extends to the bottom of the reservoir, emerges at the upper part of the reservoir and enters a valve 71. From this valve a pipe 72 runs to the injector 64—65. Assuming that the valve 71 is open, the injector will draw brine from the reservoir when water courses through the injector as above described, and mixing with the water the resulting solution passes into the tank and regenerates the softening material therein. As the chemical action thus performed is well understood, and as it forms no part of my invention it is not necessary to describe it further. The valve 71 is closed by a spring and opened by a diaphragm forming one wall of a hydraulic chamber. As this is a well known form of valve it is not necessary to illustrate or describe it further.

After a sufficient quantity of the brine solution has been passed through the softening material, a valve, which I call a flushing valve, is opened, admitting a copious flow of water to the chamber 43, but by-passing the injector. This breaks the vacuum caused by the injector and stops the influx of brine, and it introduces fresh water into the tank in a quantity as large as can be effectively employed in rinsing the brine from the softening material. The quantity of water thus used is much greater than it has heretofore been possible to introduce for flushing purposes, and the time consumed in the flushing operation is thus reduced by about one-half.

Figures 3, 5:
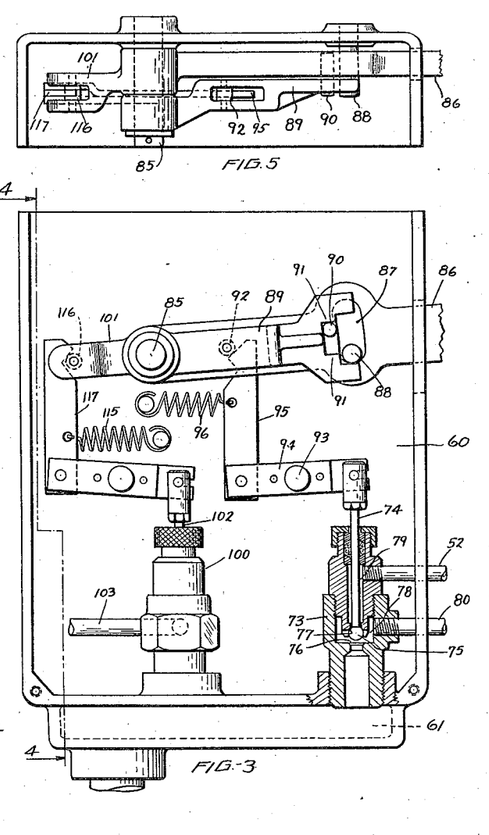
Fig. 3 is a front elevation of mechanism for initiating and controlling the regenerating operation.
Fig. 5 is a view looking down thereon.
Figures 4, 6, 7, 8:
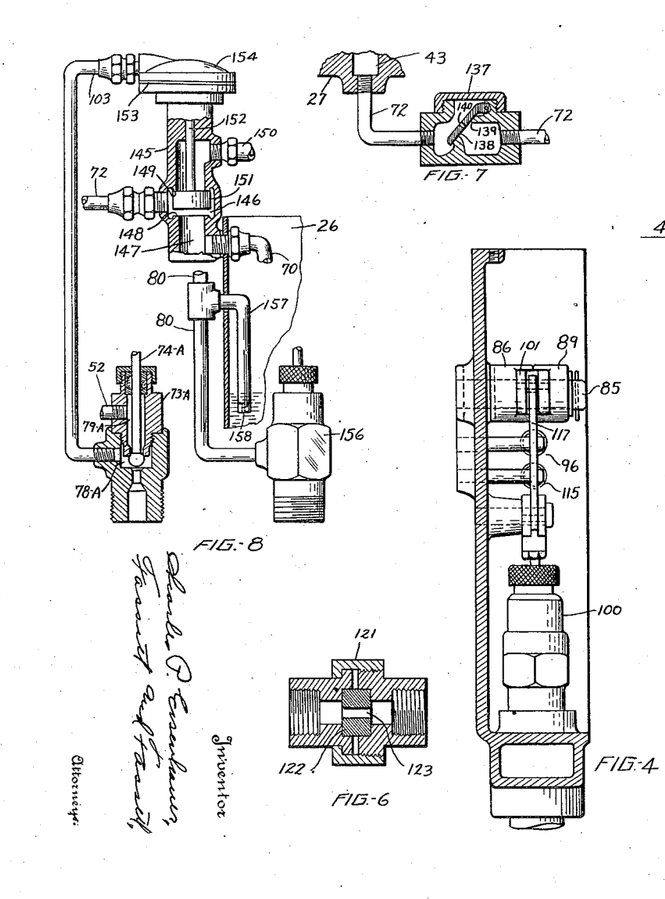
Fig. 4 is a side elevation of said mechanism.
Fig. 6 illustrates a detail of construction that will be explained presently.
Fig. 7 illustrates a modification of certain parts of my apparatus.
Fig. 8 illustrates another modification.

I shall now describe the mechanism for operating the three hydraulic valves 27, 30 and 71, referring more particularly to Figs. 3, 4 and 5. A control valve 73, located in the casing 60, is screwed into the top of the chamber 61, so water from the chamber can flow up into the valve. The valve has a vertically movable stem 74 carrying at its lower end a valve member 75. When in its lower position, which it is when the apparatus is in condition for softening water, the valve member 75 rests on a seat 76 and cuts off the water from the chamber 61. Above the valve member 75 is a second seat, 77, which seat is uncovered when the lower seat is covered, leaving a chamber 78 connected to a port 79, which port is connected to the drain pipe 52. The chamber 78 is connected by a pipe 80 to the hydraulic chambers 42 and 51, and to the hydraulic chamber of the brine valve 71. Thus the hydraulic chambers are enabled to empty into the drain pipe 52, allowing the springs of the respective valves to move the valves as described. Moving the plunger 74 upward opens the chamber 78 to the water in chamber 61 and water flows to the three hydraulic chambers, thereby operating the respective valves. I shall now describe mechanism for operating the control valve.

Mounted to rock on a stud 85 fixed in the back wall of the casing 60 is a lever 86. The throw of this lever is limited by a transverse slot 87 in the lever, that embraces a stud 88 fixed in the back of the casing. A second lever, 89, also mounted to rock on stud 85, lies parallel to and is adapted to be rocked on the stud 85 by the lever 86. These levers are capable of motion independent of each other, however, which motion is limited by a stud 90 fixed in lever 86 and adapted to play between the tines 91 of the bifurcated extremity of lever 89. Mounted on the lever 89 is a roller 92.

Mounted to rock in a more or less horizontal position on a stud 93, fixed in the back of the casing 60, is a lever 94, to one end of which an upwardly extending arm 95 is pivotally attached. The free end of this arm is drawn laterally toward the roller 92 by an extension spring 96, and the arm is cut to the shape of a reclining V, the apex of which points toward the roller. Under the tension of the spring the arm is cammed above the roller, or below it, according to which oblique side of the V is brought to bear on the roller. For example, in Fig. 3 the arm is held down by the upper face of the V bearing against the roller; moving the lever 89 downward will gradually move the roller 92 across the apex of the V, and when the roller starts to traverse the lower face of the V the arm will be snapped above the roller, toggle fashion. Returning the lever 89 to the position shown in Fig. 3 will return the arm 95 to its lower position, as in the drawing. The lever 94 is connected to the valve stem 74 and thus the valve is operated by movements of the lever 89. Remembering the connection between levers 86 and 89 it will be seen that when the lever 86 is moved the toggle mechanism just described will be operated, provided the lever 86 is moved far enough; moving the lever 86 to its limit is sufficient for this purpose.

During the normal operation of the apparatus, that is, when the apparatus is in condition for softening water, the lever 86 is in its lower position, the valve member 75 being also in its lower position. When it becomes necessary or desirable to start regenerating the water-softening material it is only necessary to lift the lever 86 to the limit of its throw and leave it there. The remainder of the operation of the apparatus is automatic.

Automatic mechanism

In the casing 60 is a second valve, 100, which valve is also in constant connection with the chamber 61. By means of a toggle mechanism similar to that just described, the valve 100 is operated directly by the lever 86, but with the difference that the toggle is operated by the end 101 of the lever 86, which extends from the opposite side of the stud 85. For this reason the stem 102 of the valve 100 moves down when the lever 86 is lifted, while the stem of valve 73 moves up, and vice versa. The valve 100 is a simple valve, being open when the stem 102 is up and closed when the stem is down. It follows that during the time the apparatus is in condition for softening water, the lever 86 being then in its down position, the valve 100 is open; but for reasons that will be given presently the valve is at that time ineffectual.

Suspended from the lever 86 is a vessel 110, which, for convenience and because of the appropriateness of the name, I shall refer to as a "bucket". The drain pipe 52 divides into two branches, 111 and 112. Branch 111 runs to the sewer or other place for disposing of waste water from the apparatus. Branch 112 runs to the bucket. The bucket has a small orifice 113 in its bottom to slowly drain the bucket. The branch 112 has a nozzle 114 with an orifice of such size that water will run into the bucket enough faster than it runs out at 113 to accumulate a given amount of water in a given time. This will be explained presently. The strength of the toggle spring 115 is sufficient to sustain the bucket with a given amount of water in it. When the amount of water in the bucket exceeds this the spring yields and allows the bucket to pull down the lever 86. The toggle spring 96 is stronger than the spring 115, made so by being placed farther from the pivot on which the toggle arm 95 rocks. For this reason the toggle spring 115 will yield before the spring 96 yields, and thus a given amount of water in the bucket will open the valve 100 before the bucket contains enough water to operate the valve 73. In Fig. 3 it will be seen that the stud 90 is in the upper part of the space between the tines 91 on the end of the lever 89. The lever 86 can therefore move downward until the stud 90 reaches the lower tine 91 without moving the lever 89, and thus only the valve 100 is operated. Water continues to flow into the bucket and when enough additional water has accumulated therein to overcome the spring 96 the valve 73 is operated, thereby restoring the apparatus to the water-softening condition, as will be more fully explained presently. In this second stage of the downward movement of the lever 86 the bucket moves the lever 86, and the stud 90 in the lever 86 moves the lever 89, which leaves the stud in contact with the lower tine of the lever 89. When the lever 86 is raised the lever 89 is not moved until the stud 90 engages the upper tine 91, then both levers move together. As the first stage of the downward movement of lever 86 raises the roller 116 above the cam on arm 117, the second stage of the movement merely raises the roller farther.

The valve 100 is what I have called the flushing valve, and as the water from this valve by-passes the injector, water can be supplied to the tank 25 for flushing purposes in much greater volume than would be possible if the water passed through the nozzle 64 of the injector. I have mentioned the nozzle 114 which restricts the flow of water to the bucket 110. The waste pipe 111 is provided with a similar nozzle, 120, with the result that the flow of waste water from the tank 25 during the flushing operation is sufficiently restricted to not only disable the injector and stop the drawing of brine from the reservoir, but it starts a flow of fresh water into the reservoir to replace the brine that has just been drawn out. It is also to be noted that at this time water is still entering through the injector, the valve member 75 being still raised and the valves 27 and 30 still being in regenerative position.

I place a restricting device 121 of known capacity in the brine pipe 72. This resembles an ordinary pipe union (see Fig. 6) but in the center is placed a nozzle 122 having an orifice 123 of considerably less diameter than the diameter of the pipe 72. This orifice is just the size necessary to permit the passage of the amount of brine required in the solution used in regenerating the softening material. This restriction is also used to regulate the amount of water returned to the reservoir to replace the brine drawn therefrom. Therefore the size of the nozzle 120 in the waste pipe 111 is so proportioned as to obtain this result.

The volume of water returned to the reservoir 26 is slightly less than the volume of brine just removed therefrom. This is so that as the supply of undissolved salt in the reservoir is gradually diminished the level of the brine in the reservoir will be reduced in the same proportion. Then when it is necessary to replenish the supply of salt there will be sufficient room in the reservoir for the new supply. In water softeners wherein the brine is constantly maintained at the original level by a float-controlled valve, regardless of the amount of salt the reservoir contains, the brine is caused to overflow when a new supply of salt is put in the reservoir, and in this way about 10% of the salt put in the reservoir is wasted. In my apparatus the amount of water returned to the reservoir after each regeneration is sufficiently restricted to insure that no brine will overflow when the salt supply is replenished.

As restricting the refilling of the reservoir so as not to waste brine involves rather exact adjustment, I prefer to over-restrict the refilling slightly. In order that this may not result eventually in exhaustion of the brine I provide a small float-controlled valve whereby to prevent the level of the brine falling below a certain point. This valve is shown at 125 in Fig. 1. The valve is operated by an arm 126, from which a float 127 is suspended. When the level of the brine falls too low the arm 126 is moved down slightly by gravity and lets in enough water from the main water supply pipe 32, to prevent the supply of brine becoming exhausted. A small pin 128 prevents the arm being lifted too far, regardless of how high the brine may rise in the reservoir. This float is protected by a shield, in the form of a tube 129, in which the float rises and falls without interference, and the whole device takes up so little room that it does not reduce the capacity of the reservoir appreciably.

As has been pointed out the flush valve 100 remains open after the lever 86 completes its downward movement, which downward movement restores the apparatus to condition for softening water. But it must be remembered that when the apparatus is in condition for softening water the valve 27 is in the condition it occupies in Fig. 1 and the brine valve 71 is closed. Therefore, although leaving the valve 100 open leaves the chamber 43 in connection with chamber 61, which chamber is constantly in connection with the water supply, the chamber 43 is closed by the valve member 38, which is held to the seat 35 by the spring 40. It is also to be noted that the chamber 43 is always in connection with the chamber 61 through the injector 64—65 and the pipe 63. Lifting the lever 86 closes the valve 100 simultaneously with opening valve 73. The opening of valve 35—38 quickly follows the closing of valve 100 but it never precedes it. Furthermore, the closing of valve 36—38 is practically simultaneous with the opening of valve 35—38. Therefore no hard water can ever pass from chamber 43 to the pipe 29.

Operation

As the operation of its several parts has been described as the parts were described, a very brief description of the operation of the apparatus as a whole will suffice. In the beginning the apparatus is in condition or position for softening water, and hard water entering the apparatus at 32 passes to the bottom of the tank 25, up through the softening material or mineral in the tank, by which the water is softened, and leaving the tank at the top the water passes through the valve 27 to the pipe 29, and thence to its destination. After a given amount of hard water has passed through the softening material the material loses its capacity for softening water and it must be regenerated. It is not desirable, however, to wait until the material has become exhausted; it is better to regenerate the material while it is still capable of softening water. When it becomes desirable, or necessary, to regenerate the material the lever 86 is lifted. This operates the control valve 73, which in turn operates the several hydraulically actuated valves and thereby starts the regenerative process, during which process the pipe 29 is cut off from the tank 25. A solution of salt and water now flows downward through the tank, leaving the tank at the bottom, whence it flows to the valve 30, by which it is directed to the drain pipe 52. The drain pipe connects to pipes 111 and 112, the latter delivering part of the waste water to the sewer and part to the bucket. Presently the lever 86 is pulled down part way by the weight of the waste water that has accumulated in the bucket, thereby stopping the regenerating operation and starting the flushing operation, during which operation the supply of water in the brine tank is replenished, and waste water continues to accumulate in the bucket. Presently the weight of the water in the bucket pulls the lever 86 down the remainder of its stroke. This returns the control valve 73 to its original position, cutting the hydraulic pressure off from the several diaphragms, and by connecting the pipe 80 to the drain allows the diaphragm valves to be restored by their respective springs to the position they occupy when the apparatus is in condition for softening water, which includes the admission of water to the pipe 29.

During the time the water is cut off from the pipe 29 no water can be drawn from the distribution system supplied by the pipe 29. In many situations where water softeners are used this is immaterial, since there are times when cutting the supply of water off from the system is not objectionable. With my apparatus this class of installations is greatly increased, because by my apparatus the time consumed in the flushing operation is greatly reduced, and the length of time the apparatus is out of service is therefore much shorter than in other water softeners. But there are some cases where even a short suspension of the water supply is undesirable, and in such cases I provide for by-passing hard water to the distributing system while the softener is out of service. Where this is necessary my improvements are very useful, as the length of time hard water must be delivered to the system is thereby greatly reduced.

To by-pass water to the distributing system when the softener is out of service I provide a valve 130 which receives water at 131 from the chamber 61 and delivers it to the pipe 29. This valve is closed and kept closed by a spring, and is opened by water pressure on a diaphragm forming one wall of a hydraulic chamber 132. Water under pressure is introduced to the chamber 132 by the pipe 80 at the same time water is introduced to the hydraulic chambers 42, 51 and 71. Thus simultaneously with the cutting off of the soft water from pipe 29 by valve 27, hard water is admitted to pipe 29 by valve 130, and the hard water is cut off from pipe 29 by this valve at the same time soft water is re-admitted by valve 27 to pipe 29. Like that of valve 71 the mechanism of valve 130 is old and well known, so it is unnecessary to illustrate or describe it in detail.

To enable the lever 86 to be lifted from a remote point I attach a cord 133 to the lever, the other end of which cord runs to said remote point. To avoid requiring the lever 86 to retrieve the cord I provide a spring 134. Thus the movement of the lever 86 is neither retarded nor assisted by the cord.

Modifications

There are several modifications possible in the structure so far described. One of these is shown in Fig. 7, which illustrates an arrangement wherein the brine is syphoned into the tank 25 instead of being injected. In this structure the pipe 63 is eliminated, as is also the injector, and the brine pipe 72 is connected directly to the chamber 43 in the valve 27. A dotted line 135 on the reservoir 26 indicates the lowest level to which the brine can fall therein. As this line is higher than the point 136, which is the juncture of drain pipes 111 and 112, and the effective outlet of water from the tank 25 during the regenerating and flushing operations, it is plain that as water flows by gravity from the tank 25 past said juncture 136, brine will be drawn from the reservoir. To avoid needless retardation of the flow of brine the restricting device 121 may be removed and a check valve 137 placed in the brine line 72. This check valve comprises a movable valve member 138 adapted to move to and fro with reference to a seat 139, according to the direction of flow in the pipe. The valve member has an orifice 140 which takes the place of the orifice 123 in the restricting device 121 to regulate the refilling of the reservoir as previously described. With this syphoning arrangement concentrated brine is drawn into the tank instead of a comparatively weak solution, but as the volume is proportionally smaller, and as the tank is full of fresh water to begin with, the concentrated brine quickly mixes with the water and forms the desired solution.

Another modification is illustrated in Fig. 8, wherein a two-way valve 145 is introduced into the brine line, taking the place of the brine valve 71. This valve comprises a chamber 146 to which the brine suction pipe 70 is connected through a port 147, which port is encircled by a valve seat 148 in the chamber 146. Opposite the seat 148 is a seat 149, surrounding a port that leads to a pipe 150, which pipe connects to the chamber 61. A valve member 151 carried at one end of a vertically slidable rod 152, is adapted to occupy seats 148 or 149, thereby closing the respective ports, and this valve member is moved to and held on seat 149 by a compression spring not shown. At its upper end the rod 152 bears against a flexible diaphragm 153 that forms the lower wall of a chamber 154, to which chamber the pipe 103 is connected, instead of to the chamber 43 of the valve 27.

During the time the softening material is being regenerated the valve 145 is in the condition it occupies in Fig. 8, the valve member 151 being on the seat 149. Brine then flows from the reservoir through the chamber 146 and pipe 72 to the chamber 43. And this is true whether brine is made to flow by means of the injector or is syphoned from the reservoir.

In this modification a valve 73A takes the place of valve 100. The valve 73A is like valve 73 of Fig. 3, and for convenience I shall use the same reference numerals as were used in describing valve 73, but append A in each case. The pipe 103 connects to the chamber 78A, and when the stem 74A is raised, as when the lever 86 is pulled down at the end of the regenerating operation, water from the chamber 61 flows through the pipe 103 to the chamber 154 and moves the valve member 151 to the seat 148. This positively stops the flow of brine and starts a flow of flushing water through the brine pipe 72. If the apparatus is arranged to syphon brine from the reservoir the pipe 72 will be connected directly to the chamber 43 of the valve 27. If the injector is used the pipe 72 will deliver the flushing water between the nozzle 64 and the throat 65, of the injector. In either case the flushing water is delivered in as large a volume as can be effectively used for rinsing the brine from the tank 25, and the softening material therein. As in the case where the valve 100 is used, the flow of flushing water is stopped by the valve 27 when the second stage of the downward movement of the lever 86 takes place. The chamber 79A is connected to the drain 52 and when the lever 86 is raised to initiate the next regenerating period the valve stem 74A is moved down, thereby cutting the pipe 103 off from the chamber 61 and connecting the hydraulic chamber 154 with the drain 52. The spring then moves the valve member 151 to the seat 149, thereby cutting off the flushing pipe 150 and connecting the pipe 72 to the brine suction pipe 70.

Where this modification is used the valve 73 is replaced by a valve 156, similar to valve 100 in Fig. 3, which is a simple open and shut valve. In fact, in the use of this modification the valves 73 and 100, of Fig. 3, are simply transposed. The pipe 80 connects to this valve and runs to the hydraulic chambers 42 and 51 as before. From this pipe 80, or from one of said hydraulic chambers, a pipe 157 runs to the reservoir 26, which pipe serves two purposes. First it allows a steady stream of water to flow to the reservoir 26 as long as the valve 156 is open. The pipe 157 terminates with a nozzle 158 that restricts the flow of water to the reservoir, so that the amount of water passing it while the valve 156 remains open, which, it will be recalled is from the time regeneration is initiated by lifting the lever 86, until the lever is returned to its lowermost position, will replace the brine removed from the reservoir, as has been explained. As the passages the water traverses to reach chambers 42 and 51 are of ample size, the hydrostatic pressure in the chambers is not appreciably lower than the pressure in chamber 61, notwithstanding this diversion of water to the reservoir. When the valve 156 closes, the pipe 157 serves to bleed the hydraulic chambers 42 and 51 and allow the springs of the respective valves to operate the valves. When this modification is used in connection with the injector the restricting device 121 need not be used; if in connection with the syphon the check valve 126 need not be used.

In some cases it may be found desirable to drain the hydraulic chambers 42 and 51 more quickly than the nozzle 158 will drain them, so the valves 27 and 30 will be operated more quickly by their respective springs. In such cases instead of replacing the valve 73 by a single valve similar to valve 100, the valve 73 may be retained and the chambers 42 and 51 left connected to the valve by the pipe 80, as was described in connection with Fig. 3. Then instead of the pipe 157 running to the valve it would merely run from one of the hydraulic chambers (42 or 51), or from the pipe 80, to the reservoir, and terminate with the nozzle 158, as described. The operation of this arrangement would be the same as has been described in connected with Fig. 8. Water from the valve 73 would operate the valves 27 and 30, while a small stream of water would be diverted to the reservoir to replace the brine withdrawn therefrom. Then when the valve member 75 is dropped to the seat 76, as when the lever 86 is pulled to its lowermost position at the end of the flushing operation, the pipe 80 will be connected to the drain 52, allowing almost instantaneous deflation of the hydraulic chambers 42 and 51, with resulting operation of the valves 27 and 30.

Another modification consists in operating the bucket 100 with water direct from the supply instead of with waste water. To do this it is only necessary to run a branch from the pipe 80 to the bucket and provide the end of the branch with a suitable nozzle. In this case the drain pipe 52 will be run directly to the sewer; that is, the branch 112 will be abolished. As all of this is such an obvious change it is deemed unnecessary to illustrate it. It is also obvious that this arrangement can be used whether the brine is injected or siphoned. It can also be used in connection with the structure shown in Fig. 8.

I have illustrated and described what I now regard as the preferred embodiment of my invention, and have described certain modifications that may be desirable under some circumstances. But it is not to be understood that a useful embodiment of my improvements is limited to these structures, as other modifications may be possible without departing from the spirit of my invention or exceeding the scope of my claims.

What I claim as my invention is as follows:

1. Apparatus for softening water, comprising a tank containing water-softening material and a reservoir containing regenerative liquid, mechanism for alternately putting said apparatus in condition for softening water and for regenerating the softening material, means comprising a lever which when lifted sets said mechanism in action, whereby the apparatus is put into regenerative condition and regenerative liquid from said reservoir is caused to flow through the softening material in said tank, and a bucket suspended from said lever, to which waste liquid from the tank is conducted, and whereby, when a predetermined amount of liquid has accumulated therein, the lever is pulled down to its former position, thereby restoring the apparatus to condition for softening water.

2. In water softening apparatus, hydraulically operated mechanism for changing said apparatus from a condition for softening water to a condition for regenerating the softening material, a control valve, means for moving said valve to a position in which by admitting water to said mechanism the latter is operated and regeneration of the softening material started, a flushing valve, means operated by the weight of an accumulation of water for opening said flushing valve and stopping said regeneration, and means operated by the weight of a quantity of water which is augmented during the time allotted to flushing the softening material, for restoring the apparatus to condition for softening water.

3. In water softening apparatus, hydraulically operated mechanism for changing said apparatus from a condition for softening water to a condition for regenerating the softening material, a control valve, means for moving said valve to a position in which by admitting water to said mechanism the latter is operated and regeneration of the softening material started, a flushing valve, means operated by the weight of an accumulation of water for opening said flushing valve and stopping said regeneration, and means operated by the weight of an additional quantity of water, said quantity being augmented during the time allotted to flushing the softening material, for returning the control valve to its original position and restoring the apparatus to condition for softening water.

4. In water softening apparatus, hydraulically operated mechanism for changing said apparatus from a condition for softening water to a condition for regenerating the softening material, a control valve, means for moving said valve to a position in which by admitting water to said mechanism the latter is operated and regeneration of the softening material started, a flushing valve, means operated by the weight of an accumulation of water for opening said flushing valve, thereby stopping said regeneration, and means operated by the weight of an additional quantity of water, said quantity being augmented during the time allotted to flushing the softening material, for restoring the apparatus to condition for softening water.

5. In water softening apparatus, hydraulically operated mechanism for changing said apparatus from a condition for softening water to a condition for regenerating the softening material, a reservoir containing regenerating liquid, a control valve, means for moving said valve to a position in which by admitting water to said mechanism the latter is operated and regeneration of said material by liquid drawn from the reservoir is begun, a flushing valve, means operated by the weight of an accumulation of water for opening said valve, means whereby water passing through said valve stops the draft of regenerative liquid from the reservoir and causes water to run into said reservoir, water traversing said valve also passing through said softening material to flush it, and means operated by an additional quantity of water, said quantity being augmented during the flushing operation, for restoring the apparatus to condition for softening water.

6. In water treating apparatus, comprising a tank containing water-treating material and a reservoir containing regenerative liquid, hydraulically operated mechanism for changing said apparatus from a condition for treating water to a condition for regenerating the treating material, a control valve, means for moving said valve to a position in which by admitting water to said mechanism the latter is operated to start regenerating said material, a flushing valve, means operated by the weight of an accumulation of water wasting from the tank during said regeneration for opening said valve, means for flushing the treating material with water from said flushing valve, at the same time stopping the flow of regenerating liquid from said reservoir and causing a limited quantity of water to flow to the reservoir, and means operated by the weight of an augmented accumulation of waste water for restoring the apparatus to condition for treating water.

7. In water-treating apparatus comprising a tank containing water-treating material, said tank having an inlet for water to be treated and an outlet for treated water, mechanism for cutting said inlet off from the source of untreated water and connecting the inlet to a drain, and for connecting said outlet to a source of regenerative liquid, a flushing valve, and means operated by a quantity of liquid accumulated while the source of regenerative liquid is connected to the tank, for opening said flushing valve, thereby starting a flow of water through the tank.

8. In water-treating apparatus comprising a tank containing water-treating material, said tank having an inlet for water to be treated and an outlet for treated water, mechanism for cutting said inlet off from the source of untreated water and connecting the inlet to a drain, and for connecting said outlet to a source of regenerative liquid, a flushing valve, means operated by a quantity of liquid accumulated while the source of regenerative liquid is connected to the tank, for opening said flushing valve, thereby starting a flow of water through the tank, and means for concurrently stopping the flow of regenerating liquid.

9. In water-treating apparatus comprising a tank containing water-treating material, said tank having an inlet for water to be treated and an outlet for treated water, mechanism for cutting said inlet off from the source of untreated water and connecting the inlet to a drain, and for connecting said outlet to a source of regenerative liquid, a flushing valve, means operated by a quantity of liquid accumulated while the source of regenerative liquid is connected to the tank, for opening said flushing valve and starting a flow of water through the tank, means for concurrently stopping the flow of regenerating liquid to the tank, and means operated by a quantity of liquid augmented while the regenerating liquid and the flushing water flowed, for stopping the flow of flushing water and restoring said inlet and outlet to their original conditions.

10. In water-treating apparatus comprising a tank containing water-treating material, said tank being connected at one end to a source of untreated water and at the other end to the destination for treated water, mechanism for cuting the tank off from said connections, for connecting one end of the tank to a drain and the other end to a source of regenerating liquid, a flushing valve, means operated by a quantity of liquid accumulated while the source of regenerative liquid is connected to the tank, for opening said flushing valve and starting a flow of water through the tank, means for concurrently stopping the flow of regenerating liquid, and means operated by a quantity of liquid accumulated while the regenerating liquid and the flushing water flowed, for stopping the flow of flushing water and restoring the tank to the original connections.

11. In a water-softening apparatus comprising a tank containing water-softening material, said tank being normally connected at one end to a source of hard water and at the other end to the destination for softened water, valve mechanism for cutting the tank off from said connections and for connecting one end of the tank to a source of brine, means for causing brine to flow to the tank, a flush-water valve, means for opening said valve when brine has flowed to the tank for a given length of time, means for operating said valve mechanism to restore the tank to its original connections after the flushing water has flowed a given length of time, means whereby the flow of flushing-water is stopped when the tank is restored to its original connections, notwithstanding the flush-water valve remains open, and means for closing the flush-water valve concurrently with connecting the tank to the source of brine.

12. In water-softening apparatus comprising a tank containing water-softening material, said tank being normally connected at one end to a source of hard water and at the other end to the destination for softened water, hydraulically actuated valve mechanism for cutting the tank off from said connections and for connecting one end of the tank to a source of brine, means for causing brine to flow to the tank, a control valve which when opened admits water to actuate said valve mechanism, a flush valve, means for closing said valve and simultaneously opening the control valve, means for reopening the flush valve without closing the control valve when brine has flowed to the tank for a given length of time, means for closing the control valve after the flush valve has been open a given length of time, and means for operating said valve mechanism to restore the apparatus to normalcy.

13. In water-softening apparatus comprising a tank containing water-softening material, said tank being normally connected at one end to a source of hard water and at the other end to the destination for softened water, hydraulically actuated valve mechanism for cutting the tank off from said connections and for connecting one end of the tank to a source of brine, means for causing brine to flow to the tank, a control valve which when opened admits water to actuate said valve mechanism, a flush valve, manually actuated means for closing said valve and simultaneously opening the control valve, means for reopening the flush valve without closing the control valve when brine has flowed to the tank for a given length of time, means for closing the control valve after the flush valve has been open a given length of time, and means for operating said valve mechanism to restore the apparatus to normalcy.

14. In water-softening apparatus comprising a tank containing water-softening material, said tank being normally connected at one end to a source of hard water and at the other end to the destination for softened water, hydraulically actuated valve mechanism for cutting the tank off from said connections and for connecting one end of the tank to a source of brine, means for causing brine to flow to the tank, a control valve which when opened admits water to actuate said valve mechanism, a flush valve, means for closing said valve and simultaneously opening the control valve, means operated by a quantity of liquid accumulated while the brine flows to the tank, for reopening the flush valve, thereby starting a flow of fresh water through the tank and stopping the flow of brine thereto, means operated by a quantity of liquid accumulated while the brine and flushing water flow, for closing the control valve, and means for operating said valve mechanism to restore the apparatus to normalcy.

15. In water-softening apparatus comprising a tank containing water-softening material, a reservoir containing regenerative liquid, and a pipe to conduct regenerative liquid from the reservoir, a control valve whereby to initiate the operation of regenerating the water-softening material, a flushing valve, means for opening said valve when the regeneration is completed, means whereby water delivered to the tank from said flushing valve creates a pressure in the tank that reverses the flow of liquid in said pipe and delivers water into the reservoir to replace regenerative liquid removed therefrom, and means for stopping said refilling before the liquid is entirely replaced.

16. In water softening apparatus comprising a tank containing water-softening material, a reservoir containing regenerative liquid and a pipe to conduct regenerative liquid from the reservoir, a control valve whereby to initiate the operation of regenerating the water-softening material, a flushing valve, means for opening said valve when the regeneration is completed, means whereby water is made to flow to said reservoir during the flushing operation to replace regenerative liquid removed therefrom, and means for arresting said flow before the level of the liquid in the reservoir has been quite restored.

17. In water softening apparatus comprising a tank containing water-softening material, a reservoir containing regenerative liquid, and a pipe to conduct regenerative liquid from the reservoir, regenerative mechanism, a control valve whereby to initiate the operation of regeneration, a valve forming part of the regenerative mechanism, said regenerative valve admitting water to the tank, an injector operated by said water and drawing liquid from said reservoir, a flushing valve, means for opening said flushing valve when the regeneration is completed, and means whereby water from said flushing valve creates pressure in the tank which kills the vacuum in said pipe and allows water to flow therethrough to the reservoir to replace liquid drawn therefrom during the regeneration.

18. In water softening apparatus comprising a tank containing water-softening material, a reservoir containing regenerative liquid, and a pipe to conduct regenerative liquid from the reservoir, regenerative mechanism, a control valve whereby to initiate the operation of regeneration, a valve forming part of the regenerative mechanism, said regenerative valve admitting water to the tank, an injector operated by said water and drawing liquid from said reservoir, a flushing valve, through which water is admitted to the tank, by-passing the injector, means for opening said flushing valve when the regeneration is completed, said flushing valve introducing water into the tank in a much greater volume than it is introduced by the injector valve.

19. In water softening apparatus comprising a tank containing water-softening material, a reservoir containing regenerative liquid, and a pipe to conduct regenerative liquid from the reservoir, regenerative mechanism, a control valve whereby to initiate the operation of regeneration, a valve forming part of the regenerative mechanism, said regenerative valve admitting water to the tank, an injector operated by said water and drawing liquid from said reservoir, a flushing valve, through which water is admitted to the tank, by-passing the injector, means for opening said flushing valve when the regeneration is completed, said flushing valve introducing water into the tank in such volume that the injector suction is destroyed and water flows through said pipe to the reservoir to replace liquid drawn therefrom during the regeneration.

20. In water softening apparatus comprising a tank containing water-softening material and a reservoir containing regenerative liquid, a control valve whereby to initiate the operation of regenerating the water-softening material, a flushing valve, means for opening said flushing valve when the regeneration is completed, means whereby during the flushing operation water is introduced into the reservoir to replace regenerative liquid removed therefrom, and means for keeping the amount of water thus replaced smaller in volume than the amount of liquid withdrawn during the last regeneration.

21. In water-softening apparatus comprising a reservoir containing brine and salt, means for drawing brine therefrom for regenerating the water-softening material, and automatic means for introducing water into the reservoir after each such draft, in an amount enough smaller than the amount of brine withdrawn, so that when the supply of salt is replenished after repeated drafts the level of the brine in the reservoir will not be raised above what it was after the last replenishment.

22. In water softening apparatus comprising a reservoir containing brine and undissolved salt, means for drawing brine therefrom for regenerating the water-softening material, and automatic means for introducing a volume of water into the reservoir after each such draft substantially equal to the volume of brine withdrawn, minus the volume of the quantity of dry salt required to convert the newly introduced water into brine.

23. In water softening apparatus, manually operated means for changing the apparatus from a condition for softening water to a condition for regenerating the softening material, automatic means for restoring the apparatus to water-softening condition, said manual means comprising a lever to be moved by hand, a cord attached to said lever whereby the lever can be moved from a remote point, and a spring attached to the cord, whereby the cord is retracted after tension is removed from its remote end and whereby the lever is relieved of the duty of retracting the cord.

24. In water-softening apparatus comprising a tank containing water-softening material, said tank being normally connected at one end to a source of hard water and at the other end to the destination for softened water, valve mechanism for cutting the tank off from said connections and for connecting one end of the tank to a source of brine, a control valve which when opened causes said valve mechanism to act and produce the effect described, means for causing brine to flow to the tank, a second valve, which when opened causes a flow of fresh water through the tank and suspension of the flow of brine to the tank, and means whereby closing the control valve causes restoration of said valve mechanism to normalcy.

25. In water-softening apparatus comprising a tank containing water-softening material, said tank being normally connected at one end to a source of hard water and at the other end to the destination for softened water, valve mechanism for cutting the tank off from said connections and for connecting one end of the tank to a source of brine, a control valve which when opened causes said valve mechanism to act and produce the effect described, means for causing brine to flow to the tank, a second valve, which when opened causes a flow of fresh water through the tank and suspension of the flow of brine to the tank, and means whereby closing the control valve causes restoration of said valve mechanism to normalcy, and stops the flow of fresh water notwithstanding said second valve has not yet been closed.

26. In a water softener, in combination with a softening tank, a pair of valve casings on the tank each having a connection with the tank, a discharge pipe for each valve casing, a hard water pipe having connection with both valve casings, and a two-position valve in each casing, each valve being held in one position mechanically and in the other position by water pressure when the valves are held mechanically in one position the water will pass into one end of the tank and out at a discharge pipe and when the valves are held in the other position the water will pass into the other end of the tank and out at the other discharge pipe.

27. In a water softener, in combination with a softening tank, a hard water inlet at each end of the tank, one inlet including an injector, a discharge outlet at each end of the tank, a source of brine connected with the injector, a hard water pipe connected to said inlets, a single valve operated by the pressure in the hard water pipe to open the outlet and close the inlet at one end of the tank and a single valve operated at the same time to open the inlet and close the outlet at the other end of the tank, whereby brine is forced into the tank at one end and discharged at the other.

28. In a water softener, in combination with a softening tank, a hard water inlet at each end of the tank, one inlet including an injector, a discharge outlet at each end of the tank, a source of brine connected with the injector, a hard water pipe connected to said inlets, a single valve operated by the pressure in the hard water pipe to open the outlet and close the inlet at one end of the tank and a single valve operated at the same time to open the inlet and close the outlet at the other end of the tank, whereby brine is forced into the tank at one end and discharged at the other end, and a valve for applying said hard water pressure and releasing it.

29. In a water softener, a tank, a supply pipe, a service pipe, a waste pipe, a hard water pipe having two branches, a pressure-operated valve mechanism to direct water from one branch to the tank or to close the branch and open a connection from the tank to the service pipe, a pressure-operated valve mechanism for directing water from the other branch to the tank or from the tank to the waste pipe, a valve casing having a hard water inlet from the hard water pipe, a drain outlet and a connection to the valve mechanisms, and a valve in said casing operable to close alternately the hard water inlet and the drain outlet, whereby pressure may be supplied to and removed from the valve mechanisms.

30. In a water softener, a tank, a supply pipe, a service pipe, a waste pipe, a hard water pipe having two branches, a pressure-operated valve mechanism for directing water from one branch to the tank or to open a connection between the tank and the service pipe and close said branch, a pressure-operated valve mechanism for directing water from the other branch to the tank or from the tank to the waste pipe, a valve casing having a hard water inlet from the hard water pipe, a drain outlet, a connection to the valve mechanisms, and a valve normally closing the hard water inlet, and means to move the valve to open the hard water inlet and close the drain outlet.

31. In a water softener, a tank, a valve casing having a connection with the tank and a supply outlet, a second valve casing having a connection with the tank and a waste outlet, a hard water pipe having an inlet to each of said valve casings, a valve in one casing normally closing the waste outlet, a valve in the other casing normally closing the hard water inlet, each valve casing having a pressure chamber for receiving hard water pressure to shift the valves, a third valve casing having a hard water inlet from the hard water pipe, a drain outlet, and a connection to each pressure chamber, a valve in said third casing normally closing the hard water inlet, and means to operate the last-named valve to open the hard water inlet to admit hard water pressure to the pressure chamber.

32. In a water softener, in combination with a softening tank and a brine tank, a valve casing having a supply outlet, softening tank connection and a regenerating inlet, a valve for alternately closing the outlet and the inlet, an injector means connected to the inlet, a hard water pipe having a branch pipe to the injector means, a brine pipe extending from the brine tank to the injector means, whereby brine is drawn into the softening tank by the hard water in the branch pipe when the valve closes the service outlet, and a second hard water branch pipe leading to the injector means to overcome the injector action of the first branch and cause the refilling of the brine tank and the washing of the softening tank.

33. In a valve mechanism, a valve casing having therein a chamber, an inlet to the chamber, an outlet from the chamber and a passageway into the chamber between the inlet and the outlet, a valve in the chamber to cut off either the inlet or the outlet, and an injector connected to the inlet.

CHARLES P. EISENHAUER.